Figures 1, 2:
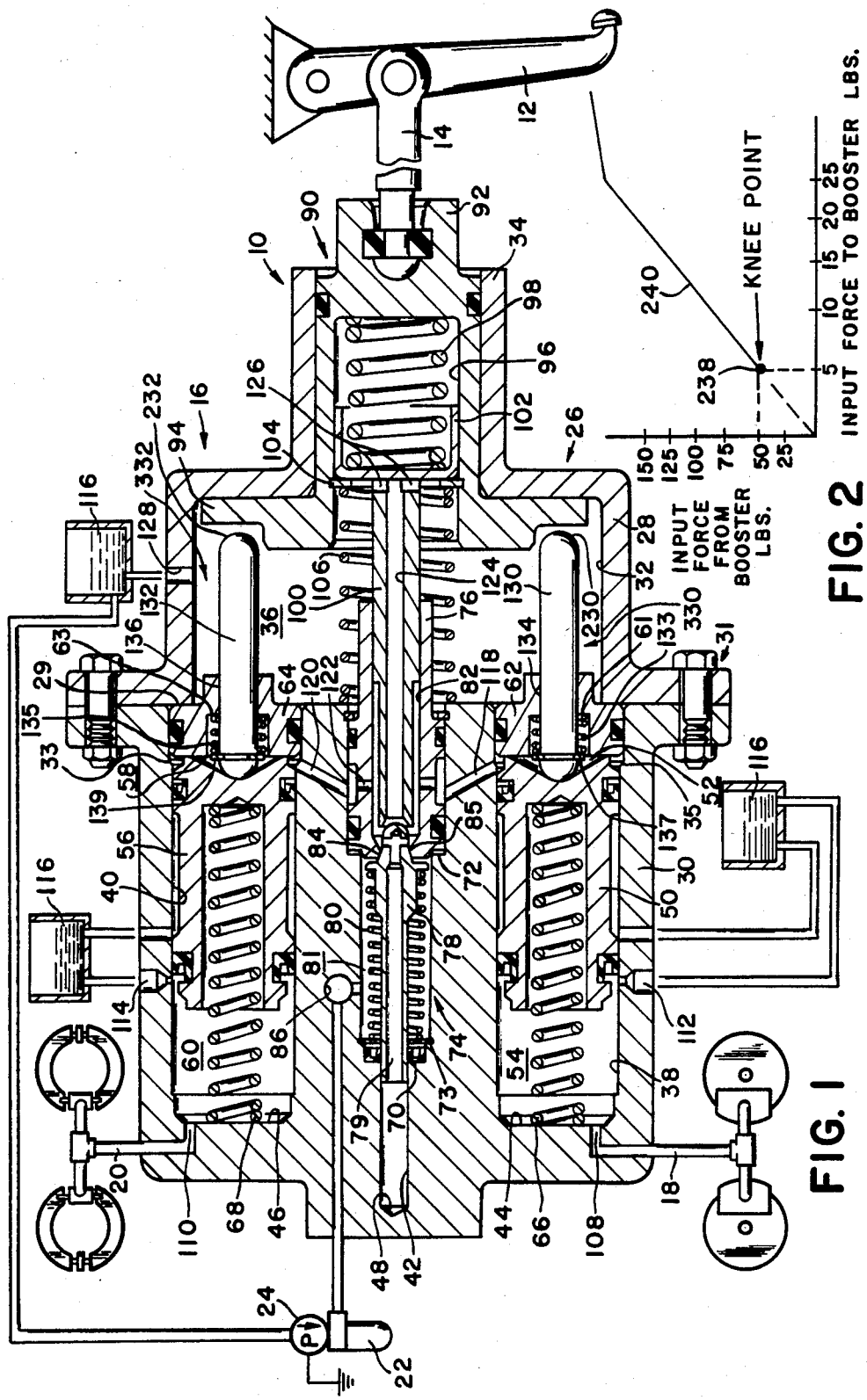

United States Patent [19]

Bach et al.

[11] Patent Number: 4,604,870
[45] Date of Patent: Aug. 12, 1986

[54] BRAKE BOOSTER

[75] Inventors: Lloyd G. Bach; Lawrence R. Myers, both of South Bend, Ind.; Robert F. Gaiser, Stevensville, Mich.

[73] Assignee: Allied Corporation, Morristown, N.J.

[21] Appl. No.: 677,271

[22] Filed: Dec. 3, 1984

[51] Int. Cl.[4] ............................................. B60T 13/20
[52] U.S. Cl. ......................................... 60/551; 60/553; 60/581
[58] Field of Search ...................... 60/547.1, 552, 553, 60/554, 548, 581, 551

[56] References Cited

U.S. PATENT DOCUMENTS

| 3,408,815 | 11/1968 | Stelzer | 60/553 |
| 3,907,375 | 9/1975 | Lewis | 60/548 |
| 3,979,153 | 9/1976 | Ingram | 303/6 R |
| 4,464,899 | 8/1984 | Myers | 60/547.1 |
| 4,534,171 | 8/1985 | Leiber | 60/554 |

FOREIGN PATENT DOCUMENTS 3110028 9/1982 Fed. Rep. of Germany ........ 60/554

Primary Examiner—Abraham Hershkovitz
Attorney, Agent, or Firm—Leo H. McCormick, Jr.; Ken C. Decker

[57] ABSTRACT

A brake booster (16) includes a pair of pistons (50, 56) and a valve assembly (74) operable to communicate fluid pressure to the pair of pistons (50, 56). An input assembly (90) moves in response to an input force to control the operation of the valve assembly (74). Movement of the valve assembly (74) allows fluid to be supplied to working chambers (52, 58). Resilient means (133, 135) acts on and holds pins (130, 132) against the pistons (50, 56). When the fluid pressure in the working chambers (52, 58) acting on the pins (130, 132) is sufficient to overcome the resilient means (133, 135) an increase in the fluid pressure in chamber (52, 58) moves the pins (130, 132) into engagement with the input assembly (90) to oppose movement of the input assembly (90) since a desired brake force has been generated.

4 Claims, 2 Drawing Figures

U.S. Patent  Aug. 12, 1986  4,604,870

BRAKE BOOSTER

The present invention relates to a brake booster wherein a housing supports a pair of pistons and a valve assembly is operable to control fluid communication of fluid pressure to a pair of working chambers. More particularly, the invention relates to a full power brake booster wherein fluid pressure from an accumulator is selectively communicated to the working chambers.

A brake booster including a housing with a first bore (38) receiving a first piston (50), a second bore (40) parallel to the first bore (38) and receiving a second piston (56), a third bore (42) receiving a valve assembly (74), an input assembly (90) extending into the housing and cooperating with the valve assembly (74) during a brake application to control fluid pressure communication to the first and second bores, and connecting means (130, 132) disposed between the input assembly (90) and the first and second pistons (50, 56) to provide a mechanical connection therebetween in the event fluid communicated to the first and second bores fails to move the first and second pistons respectively.

U.S. Pat. No. 3,979,153 discloses a booster operated master cylinder which includes a pair of parallel bores receiving a pair of pistons and a valve assembly is operated by an input assembly to control communication of fluid pressure to the bores to move the pair of pistons. During a brake application, the reaction forces opposing movement of the input assembly are determined by a pair of springs engaging the input assembly and the fluid pressure acting against the input assembly. The pair of pistons include extensions to permit mechanical connection with the input assembly in the event of a failure in the fluid pressure media used to move the pistons; however, the extensions impart no reaction forces to the input assembly during normal operation. Consequently, the extensions perform a single function within the booster operated master cylinder.

U.S. Pat. No. 4,464,899 discloses a hydraulic brake booster having connecting pins for immediately transmitting a reaction force from operating positions to an input member.

The present invention is characterized in that said connecting means includes resilient means (133, 135) that urge pins (130, 132) into engagement with pistons (50, 56) to establish a spacing or gap between said input assembly (90) and said pistons (50, 56) to permit said input assembly to move initially during the brake application in the absence of fluid pressure communication to chambers (52, 58) in first and second bores (38, 40), respectively. Thereafter input assembly engages the valve assembly (74) to open the latter and communicate fluid pressure to said first and second chambers (52, 58) whereby said pistons are moved to actuate brake assemblies associated with the first and second bores (38, 40). The connecting means (330, 332) is pressure responsive to the fluid pressure communicated to said first and second chambers (52, 58), and separates from said first and second pistons (50, 56) when the fluid pressure acting against said pins (130, 132) overcomes the resilient means (133, 135) to transmit a reaction force opposing movement of said input assembly (90) after the initial brake application. Thus, the reaction forces are delayed in being transferred to the input member to allow the output force to move the brake pads or shoes into engagement with a rotor or drum prior to opposing the input force.

It is an advantage of the present invention that during an initial brake application the vehicle operator experiences light pedal effort as the input assembly is moving against the input assembly return spring and after the initial braking application the vehicle operator experiences a hard pedal effort directly related to the fluid pressure acting against the pistons and the connecting means.

It is a further advantage that a set point or "knee" for comparing output pressure with vehicle operator input force can be determined by the spacing or gap designed in the connecting means.

The FIG. 1 illustrates a braking system with a sectional view of a brake booster constructed in accordance with the present invention; and FIG. 2 is a graph illustrating the relationship of operational input force to operational output force.

The brake system 10 includes a brake pedal 12 connected via an input rod 14 with a brake booster 16. The brake booster 16 communicates with a first brake circuit 18 and a second brake circuit 20. These brake circuits are illustrated as conventional axle to axle; however, the brake booster 16 could also be used with a cross-split brake circuit. An accumulator 22 is charged with fluid pressure by means of a pump 24 which can be driven by an electric motor or by an engine belt and pulley.

The brake booster 16 includes a housing 26 comprising a first part 28 and a second part 30 which are secured together by bolt and nut assemblies 31. The first part 28 defines a stepped bore 32 extending from an open end 34 to a chamber 36. The second part 30 defines a first bore 38, a second bore 40 and a third bore 42 extend from respective bottom walls 44, 46 and 48 to the chamber 36. The bore 38 receives a first piston 50 sealingly engaging the wall of bore 38 to define a first working chamer 52 and a first pressure chamber 54. Similarly, the bore 40 receives a second piston 56 sealingly engaging the wall of bore 40 to define a second working chamber 58 and a second pressure chamber 60. A first plug 62 is disposed within the bore 38 between annular shoulder 33 and face 29 on housing 28 to define a rest position for the piston 50 and a second plug 64 is disposed within the bore 40 between annular shoulder 35 and face 29 on housing 28 to define a rest position for the piston 56. A pair of springs 66 and 68 are disposed within chambers 54 and 60, respectively, to bias the pistons 50 and 56 to their respective rest positions engaging the plugs 62 and 64.

The third bore 42 is stepped to define shoulders 70, 72 and 73. A valve assembly 74 is disposed within the third bore. The valve assembly includes a valve seat member 76 and a valve member 78 biased into engagement with the valve seat member 76 by means of a spring 80 extending from the shoulder 73 to the valve member 78. The valve seat member 76 has a bore 82 leading to an opening 84. The valve member 78 extends into the opening 84 to engage the wall or seat 85 of the opening 84, thereby preventing fluid communication between the bore 82 and chamber 81 between shoulders 70 and 72. The section of the bore 42 between the shoulders 70 and 72 is in constant communication with the accumulator 22 via an inlet 86.

An input assembly 90 is connected with the input rod 14. The input assembly 90 includes a piston 92 sealingly and movably engaging the wall of bore 32 adjacent opening 34. The piston 92 includes a radially extending flange 94 within chamber 36 and a recess 96 receives a spring 98. The input assembly 90 also includes a plunger 100 extending into the valve seat bore 82 and opposing the valve member 78. A cap 102 is engageable with the end of the plunger 100 and a piston snap ring 104 defines a rest position for the cap 102. A spring 106 which extends from the housing part 30 to the snap ring 104 opposes movement of the piston 92 and urges the flange 94 toward abutment with the housing part 28.

The housing part 30 has an outlet port 108 which connects the first pressure chamber 54 with the brake circuit 18 and a second outlet port 110 which connects the second pressure chamber 60 with the brake circuit 20. A pair of compensation ports 112 and 114 on the housing part 30 communicate the pressure chambers 54 and 60 with reservoirs 116 in the rest condition. The housing part 30 has passages 118 and 120 extending from the bore 42 to the bores 38 and 40 to communicate the working chambers 52 and 58 with the valve assembly 74 and the valve member seat 76. The valve seat member 76 has a plurality of communicating the seat bore 82 with the passages 118 and 120. The plunger 100 forms an axially extending bore 124 to communicate the working chambers 52 and 58 with the chamber 36 via radial openings 126 adjacent the cap 102. The chamber 36 is continuously open to the reservoirs 116 via an outlet 128.

Pistons 50 and 56 are joined to the input assembly 90 by connecting linkage 330 and 332. The connecting linkage 330 and 332 include pins 130 and 132 which are movably carried by the plugs 62 and 64 by means of plug openings 134 and 136, respectively. In the rest position illustrated in FIG. 1, the pins 130 and 132 are held against pistons 50 and 56 by springs 133 and 135 retained between snap rings 137 and 139 attached to pins 130 and 132, respectively and shoulders 61 and 63 on plugs 62 and 64, respectively, to establish a set gap between ends 230 and 232 and flange 94. The pins are movably disposed within the openings 134 and 136 to be pressure responsive to the fluid pressure communicated to their associated working chambers 52 and 58. When flange 94 moves through the gap distance pins 130 and 132 provide a connection between the piston flange 94 and the pistons 50 and 56 to manually operate the brake booster 16 in the event of a failure in the fluid pressure system.

The brake booster 16 is shown in the rest position so that the pistons 50 and 56 are in abutment with their respective plugs 62 and 64, the input piston flange 94 is in abutment with the housing 28, and the pins 130 and 132 engage pistons 50 and 56 to establish with the flange 94. Fluid pressure from the accumulator 22 is in communication with chamber 81 between the shoulders 70 and 72; however, since the diameter of valve member 78 is substantially the same at the opening 84 as at the left end, the valve member 78 is pressure balanced and the spring 80 maintains the valve member 78 in engagement with the valve seat 85 to close fluid communication between the accumulator and the working chambers. The plunger 100 is spaced from the valve member 78 to open the bore 124 to the working chambers so that the latter are opened to the reservoirs 116. During a brake application, the brake pedal 12 is pivoted clockwise to move the input rod 14 and piston 92 to the left. The snap ring 104 moves with the piston to contract the spring 106. Initially, movement of piston 92 is directly transferred to valve seat member 76 through spring 98. As fluid pressure is communicated to bore 82, spring 92 collapses and changes the rate at which plunger 100 moves in response to movement of piston 92.

Since the gap between the ends 230, 232 of pins 130 and 132 and flange 94 is greater than the spacing between the plunger 100 and the valve member 78, during initial braking, the valve member 78 opens before the gap is closed to form a link between flange 94 and the pistons 50 and 56. When the plunger 100 engages the valve member 78 and separates or moves the latter off valve seat 85, fluid pressure is communicated to the bore 82 and to the working chambers via the restricted orifices 122 and the passages 118 and 120. A passage in valve member 78 communicates fluid pressure to the left end of the valve member so that the latter is pressure balanced during the brake application. The fluid pressure within the bore 82 acts against the plunger 100 to bias the latter to the right as shown in the drawing against spring 98. Also, the fluid pressure within the working chambers 52 and 58 acts against the pistons 50 and 56 to cause the latter to move to the left in FIG. 1 thereby pressurizing the fluid trapped in the first and second pressure chambers 54 and 60. The fluid pressure in the working chambers 52 and 58 also acts against the pins 130 and 132 to oppose movement of the latter to the left by springs 133 and 135, respectively. As the fluid pressure in chambers 52 and 58 increases and at some point the force generated by the pressure acting on pins 130, 132 is equal to the spring force of springs 133, 135 illustrated as the knee point 238 in FIG. 2. Thereafter, an increase in the fluid pressure in chambers 52, 58 produces a force which urges the pins 130 and 132 into engagement with the flange 94. The pins 130, 132 cooperate with the plunger 100 to generate a reaction force opposing movement of the piston 92 by the input force. This follows from the fluid pressure acting against the plunger and pins. Consequently, three reaction areas are provided and during initial braking fluid pressure communicated to the working chambers 52 and 58 acts against these reaction areas to gradually generate a reaction force proportional to the output force acting against the pistons 50, 56 in a manner illustrated by curve 240 in FIG. 2.

Further braking force causes the spring 98 to contract slightly while the valve member 78 is modulating between an open position and a closed position, thereby increasing communication of fluid pressure to the working chambers 52 and 58. The pistons 50, 56, in response to this increased fluid pressure in chambers 52, 58, move further to the left to contract their associated springs 66 and 68 and increase fluid pressure within the pressure chambers 54, 60 and brake circuits 18, 20. Beyond further braking, the input assembly 90 is moved to the left so that the plunger 100 pushes the valve member 78 to the left toward the end of bore 42 near bottom wall 48. Alternatively, depending on the selected spring constants for springs 98 and 80, the input assembly piston 92 is movable relative to the plunger 100 so that the latter is received within the recess 96 to further contract spring 98. In addition, the input assembly 90 moves to the left to connect the pins 130 and 132 with the pistons 50 and 56 so that further movement of the input assembly 90 to the left increases the fluid pressure in the output chambers 54 and 60.

Upon termination of braking, the force on the pedal 12 is relieved by the vehicle operator so that the spring 106 biases the piston 92 to move to the right. The fluid pressure acting against the plunger 100 and pins 130 and 132 also biases the piston 92 to move to the right. The plunger 100 and the valve member 78 move to the right to engage the valve member 78 with the valve seat 85 and separate the plunger 100 from the valve member 78. Consequently, fluid pressure within the working chambers 52 and 58 is vented to chamber 36 via openings 118, 120 and 122 to allow springs 66 and 68 to urge the pistons 50 and 56 toward the plugs 62 and 64.

During termination of braking, the pins 130 and 132 move to the right with the flange 94 in response to fluid pressure in the working chambers. When the fluid pressure in the working chambers 52 and 58 is vented to the chamber 36, the springs 133 and 135 move pins 130, 132 against pistons 50 and 56 while the piston 92 continues to move to the right until the flange 94 abuts the housing part 28. Consequently, the actuation gap between the pins 130 and 132 and the flange 94 is reestablished.

By selecting the size of spring 133, 135, the force required to be generated by the fluid pressure in chambers 52, 58 acting on pins 130, 132 can be controlled and, consequently, the knee point 238 could be shifted to delay the introductions of the output force to oppose in input force. By selecting the proper spring force for a particular vehicle, a balance can be achieved between the front 18 and rear 20 brakes.

In the event of a failure in either the pump 24, accumulator 22, valve assembly 74, or associated lines the input piston 92 is movable to the left by the pedal 12 and engages pins 130 and 132 after the gap is traversed to mechanically push the pistons 50 and 56 to the left and provide a connection between the input piston 92 and the pistons 50 and 56 during a manual brake application. In the failure mode, the valve member 78 is moved to the left to contract the spring 80 and the plunger is moved into the recess 96 to contract spring 98.

It is feasible for one skilled in the art to include sealing rings between the plugs and pins should the sliding fit not provide adequate sealing for the working chambers. Also, the plunger and seat could be provided with a sealing ring therebetween.

We claim:

1. A brake booster including a housing with a first bore (38) receiving first piston (50), a second bore (40) parallel to the first bore (38) and receiving a second piston (56), a third bore (42) receiving a valve assembly (74), an input assembly (90) extending into the housing and responsive to an input force for moving valve assembly (74) during a brake application to control fluid pressure communication to the first and second bores, and connecting means (330, 332) disposed between the input assembly (90) and the first and second pistons (50, 56) to provide a mechanical connection therebetween, the improvement wherein said connecting means (330, 332) comprises pins (130, 132) which are urged toward the first and second pistons (50, 56), respectively, by resilient means (133, 135) to establish a gap between said input assembly and connecting pins (130, 132), said gap allowing said input assembly (90) to move said valve assembly (74) and communicate fluid pressure to said first and second bore (38, 40) whereby said pistons (50, 56) are moved to actuate brake assemblies associated with said first and second bores (38, 42), said fluid pressure in said bores (38, 40) acting on said pins (130, 132) and at a predetermined fluid pressure level overcoming said resilient means (133, 135) to move said pins, to close said gap and to thereafter provide said input assembly (90) with a delayed reaction force that opposes the input force during a brake application.

2. The brake booster as recited in claim 1, wherein said resilient means (133, 135) controls the delay in supplying the input assembly (90) with an indication of the output force being produced in said first and second bores (38, 40) by movement of said pistons (50, 56).

3. The brake booster as recited in claim 2, wherein said input assembly (90) engages said pins (130, 132) to manually move said pistons (50, 56) in said first and second bores (38, 40), respectively, to effect a brake application in the absence of fluid pressure therein.

4. The brake booster, as recited in claim 3 wherein said delayed reaction force allows said brake assemblies to be activated without detracting from said input force.

* * * * *